UNITED STATES PATENT OFFICE.

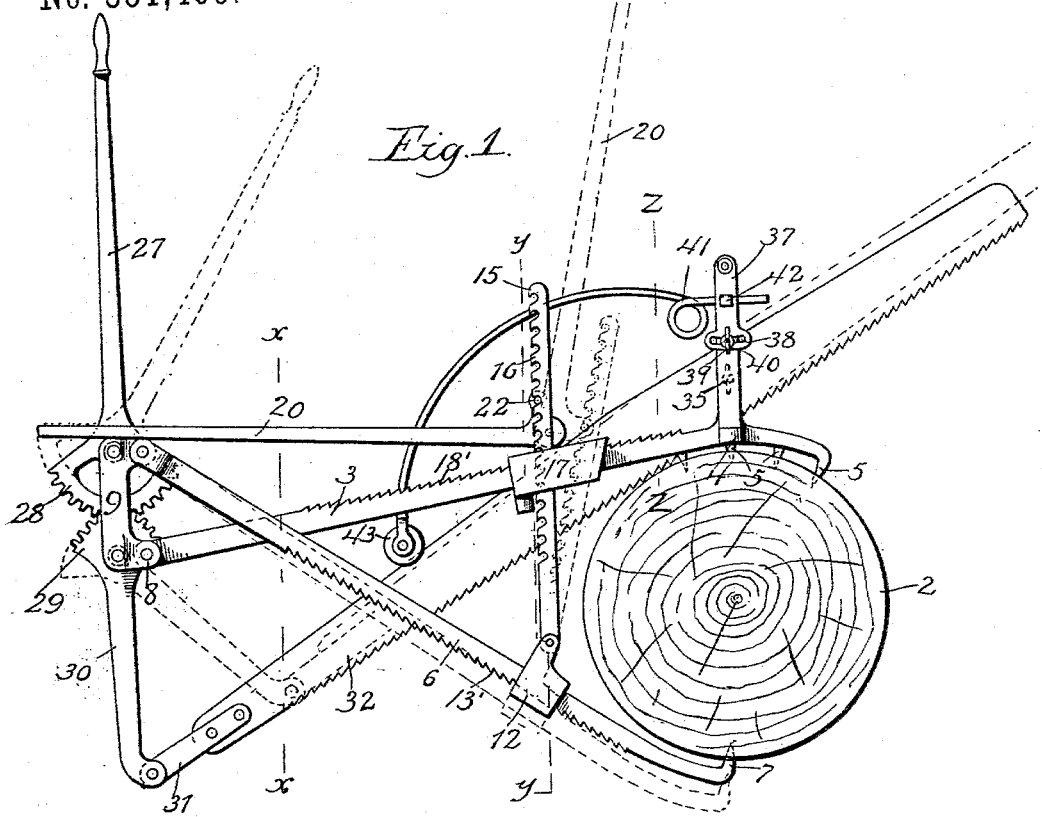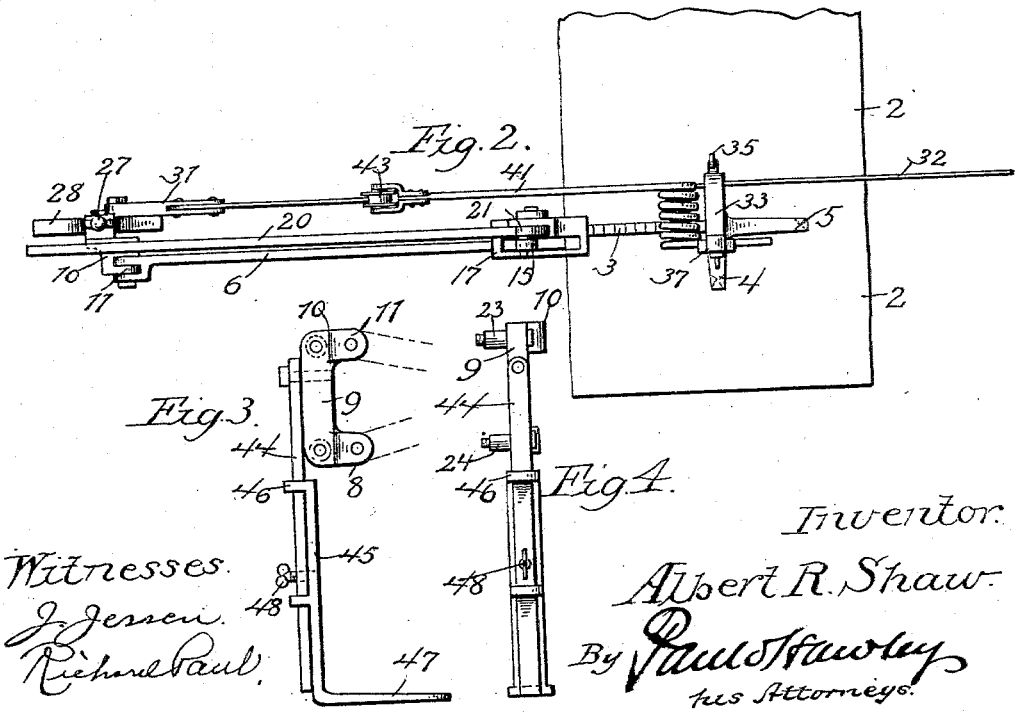

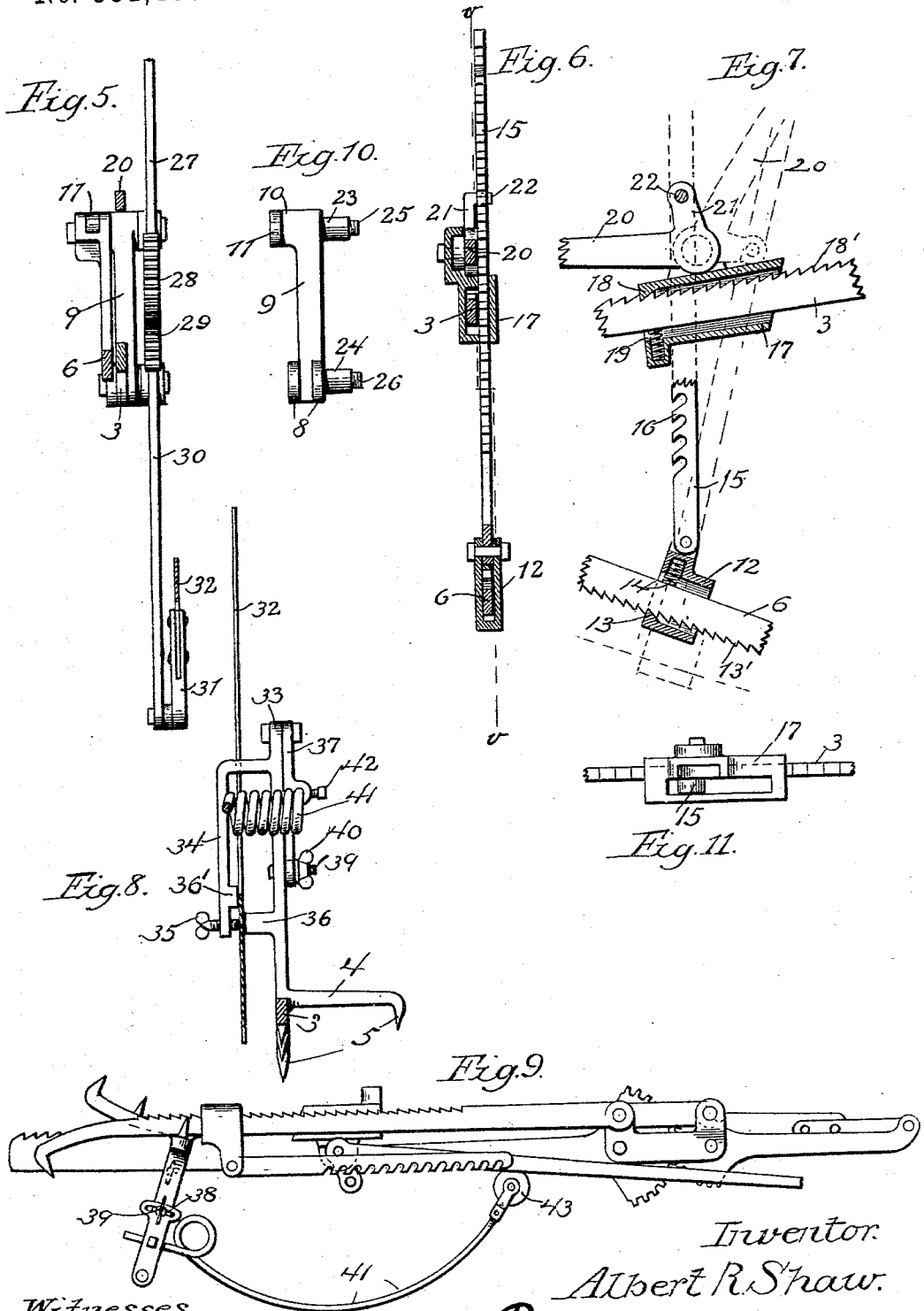

ALBERT R. SHAW, OF CHICAGO, ILLINOIS, ASSIGNOR OF ONE-HALF TO ROBERT McAFEE, OF MINNEAPOLIS, MINNESOTA.

FOLDING LOG-SAW.

SPECIFICATION forming part of Letters Patent No. 551,409, dated December 17, 1895.

Application filed January 7, 1895. Serial No. 534,063. (No model.)

*To all whom it may concern:*

Be it known that I, ALBERT R. SHAW, of Chicago, Cook county, State of Illinois, have invented certain new and useful Improvements in Folding Log-Saws, of which the following is a specification.

My invention relates to portable log-saws, and the object which I have in view is to provide a light compact saw which can be folded up and carried from place to place.

A further object is to provide a saw which can be used with or without a base, as desired, and further to provide a saw which can be used at any angle to saw a log or standing tree.

A still further object is to provide a saw which will require but little power to operate it.

My invention consists generally in the construction and combination hereinafter described, and particularly pointed out in the claims.

In the accompanying drawings, forming part of this specification, Figure 1 is a side elevation of the device embodying my invention. Fig. 2 is a plan view of the same. Fig. 3 is a side view of a portion of the main frame of the device, showing an adjustable base attached thereto. Fig. 4 is a front view of the same. Fig. 5 is a sectional view on the line $x\ x$ of Fig. 1. Fig. 6 is a sectional view on the line $y\ y$ of Fig. 1. Fig. 7 is a longitudinal section on the line $v\ v$ of Fig. 6. Fig. 8 is a sectional view on the line $z\ z$ of Fig. 1. Fig. 9 is a plan view showing the device folded. Figs. 10 and 11 are details.

In the drawings, 2 represents a log of any size which it is desired to saw. The device is secured to the top of the log by the dog or clamp 3, having the laterally-extending arm 4, which acts as a brace to support the device, and is provided as is also the main portion of the dog with teeth 5 to be driven into the log. The saw is secured to the log on the under side thereof by a second dog 6 also provided with a tooth or teeth 7 to engage the under surface of the log to be sawed. The arm or dog 3 is pivoted at one end in a slot between two lugs 8 at the lower end of the part 9 of the frame. The upper end of the part 9 is provided with a lateral extension 10 having a lug 11 to engage the forked end of the arm or dog 6. This offset or lateral extension in the end of the part 9 allows one arm or dog to pass the other, so that the device can be folded as shown in Fig. 9. A sliding block 12 is provided on the dog 6 and is provided with a single tooth 13 to engage one of a series of teeth 13' on the under side of the arm or dog. A spiral spring 14 is arranged in the block to hold the tooth 13 in engagement with the under surface of the block. Pivoted to the upper end of the block is a bar 15 having a series of slightly-curved teeth 16. The bar 15 passes through a slot in a block 17 slidably arranged on the arm or dog 3. The block 17 is provided with a tooth 18 to engage one of the series of teeth 18' on the upper side of the dog 3. A spring 19 is provided in the block 17 beneath the dog to hold the block against the upper surface thereof. A cam-lever 20 is provided to bear upon the upper surface of the block 17, said lever being provided with a projection 21 having a lateral extension 22 to engage the bar 15 between the teeth 16, as shown in Fig. 1. By means of this lever the dogs may be clamped securely to the log or tree which it is desired to saw, and the blocks may be arranged in the dogs at any desired point, according to the size of the log to be sawed.

The part 9 of the frame of the device is provided with the laterally-extending studs 23 and 24, arranged respectively at the upper and lower ends of said part. These studs may be formed integrally with the part or may be turned out and arranged to screw into said part. Each stud is provided at its outer end with threaded extensions 25 and 26, as shown in Fig. 10. Arranged upon the stud 23 is a lever 27 having a segmental gear 28 at its lower end. This segmental gear 28 engages a similar segmental gear 29 on the stud 24. The segmental gear 29 is provided with the downward extension 30, to the lower end of which is pivoted a plate 31 having the saw proper 32 rigidly secured to its outer end. The outer end of the dog 3 is provided with the upward extension 33 having a downwardly-extending loop 34 at its upper end in which is arranged a thumb-nut 35. Opposite the thumb-nut 35 on the main portion of the upwardly-extending part 33 is a stud 36. The studs 36 and 36' act as guides for the saw-blade proper and hold it very steady when the teeth are first entering the log or tree. At the extreme upper end of the extension 33 is pivoted the part 37 having a transverse slot 38 in its lower end, through which passes a threaded stud 39 secured to the arm 33. A thumb-nut 40 is arranged on the outer end of the stud 39 so that the swinging or pivoted part 37 may be secured in any desired position. The spring 41 has one end inserted in an opening in the swinging part 37 and is secured therein by a set-screw 42. A coil is provided in the spring near this end, and the other portion of the spring is inclined downward and is provided at its extreme end with a roller 43, which rests upon the upper edge of the saw proper 32. The pressure of this spring upon the saw tends to force it into the log and hold the teeth in engagement with the wood.

In Fig. 3 is shown a base which may be attached to the device at any time. It consists of a standard 44 secured to the part 9 of the main frame of the device, and upon this standard 44 is arranged a sliding part 45 provided with guides 46 at intervals thereon, and arranged to slide on the standard 44. The part 45 is also provided with a foot 47 to rest upon the ground, and with a thumb-nut 48 by means of which it may be secured to the standard 44 at any desired point.

The operation of the device is as follows: Whenever it is desired to saw a log of any size or a standing tree, the device is unfolded, the dog 3 placed upon the upper side of the log, and the dog 6 on the under side thereof. The blocks 12 and 17 are then arranged on the respective dogs at a point near the log, and the lever 20 placed in position on the block 17 with the lug or projection 22 in engagement with the bar 15, as indicated by dotted lines in Fig. 1. The lever 20 is then brought forward to the position indicated by full lines in Fig. 1, carrying with it the arm 15 and raising it at the same time and thereby forcing the teeth in the outer end of the arms or levers 3 and 6 into the log and clamping them securely thereto. The spring 41 is then arranged so that the roller 43 will bear upon the upper surface of the saw proper, and any desired tension is put upon the saw by means of the adjustable part 37 on the extension 33. Then by moving the lever 27 forward to the position indicated by dotted lines in Fig. 1 the saw will be put in motion, and as the lever is moved back and forth the saw will be reciprocated and will rapidly cut its way through the log or tree.

Very little power will be required to operate the saw and it may be used in a vertical position, as shown in Fig. 1, or it may be clamped to the side of a tree, or may be used at any angle at which the log may lie or the tree may stand. As soon as the saw has cut through the log at the point where the device is placed the lever is thrown back and the dogs disengaged from the log and the device moved to another position and clamped to the log again in readiness for another cut.

Having thus described my invention, I claim as new and desire to secure by Letters Patent—

1. A folding log saw, consisting of a frame, dogs having one end pivotally secured thereto, their outer ends being arranged to bear upon the opposite sides of a log or tree, said dogs being provided with blocks arranged to slide thereon, means for holding said blocks in any desired position on said dogs, a bar pivoted to one of said blocks and arranged to slide in a slot in the other block, and means for putting said bar under tension and decreasing the distance between said blocks and thereby clamping the dogs to the log or tree, substantially as described.

2. A folding log saw, consisting of a frame, the dogs pivotally secured to said frame, the outer end of said dogs being arranged to bear upon the opposite sides of the log or tree, blocks slidably arranged upon said dogs, means for securing said blocks in any desired position on said dogs, an arm pivotally secured to one of said blocks and arranged to slide in an opening in the opposite block, said arm being provided with a series of slots or openings, and a cam lever having a projection to engage one of said slots, substantially as described.

3. A folding log saw, consisting of a frame, the dogs 3 and 6 pivoted respectively to the lower and upper ends thereof, said dogs being provided with a series of teeth, blocks slidably arranged upon said dogs and forming a tooth to engage the serrations upon said dogs, springs for holding the teeth upon said block in engagement with the serrated surface of said dogs, an arm pivotally secured to the blocks upon said dog 6, and arranged to slide in a slot in the block upon said dog 3, said arm being provided with a series of slots, and a cam lever arranged to bear upon said last named block and forming a projection to engage one of the series of slots in said arm, for the purpose set forth.

4. A folding log saw, consisting of a frame, the dog 3 pivoted to the lower end thereof and arranged to bear at its outer end upon a log or tree, a dog 6 also pivoted to said frame and arranged to bear at its outer end upon the opposite side of said log or tree, means for clamping the dogs securely to the log, an arm 33 arranged upon the outer end of said dog 3 and provided at its upper end with a pivoted arm 37, means for clamping said pivoted arm to said arm 33, a spring carried by said arm 37 and arranged to bear at its free end upon the upper edge of the saw, substantially as described.

5. A folding log saw, consisting of a frame, the dogs 3 and 6 pivoted thereto, and arranged to bear respectively upon the opposite sides of a log or tree, said dog 3 being provided near its outer end with an upward extension 33, said extenston 33 having a swinging arm near its upper end, means for regulating the throw of said arm and for clamping it securely to said upward extension 33, a spring carried by said swinging arm, said spring being formed into a coil near its fixed end, and the opposite or free end being provided with a roll to rest upon the upper edge of the saw, and said saw being connected to said frame by a pivoted arm, and means for reciprocating said arm and saw, substantially as described.

6. A folding log saw, consisting of a frame, dogs pivotally secured thereto and arranged to bear upon the opposite sides of the log or tree, an arm pivotally secured to the lower part of said frame, a saw connected to said arm, means for reciprocating said saw and arm, an upward extension provided with a loop at its upper end, the lug 36 on the main portion of said upward extension opposite a thumb screw in said loop portion, a space being provided between the same to receive the saw blade, and a yielding mechanism carried by said upward extension 33 to bear upon the upper edges of the saw to hold the teeth of the same in engagement with the wood, substantially as described and for the purpose specified.

In testimony whereof I have hereunto set my hand this 28th day of November, A. D. 1894.

ALBERT R. SHAW.

In presence of—
C. G. HAWLEY,
RICHARD PAUL.